United States Patent

Snoeyenbos

[11] Patent Number: 5,826,893
[45] Date of Patent: Oct. 27, 1998

[54] MACHINERY MOVER

[75] Inventor: Gordon E. Snoeyenbos, Decatur, Ill.

[73] Assignee: Vega Enterprises, Inc., Decatur, Ill.

[21] Appl. No.: 891,659

[22] Filed: Jul. 11, 1997

Related U.S. Application Data

[60] Provisional application No. 60/023,082 Aug. 2, 1996.

[51] Int. Cl.[6] .................................................. B62D 33/08
[52] U.S. Cl. .......................... 280/43; 280/43.17; 280/46; 280/35
[58] Field of Search ........................ 280/35, 638, 655.1, 280/659, 43, 43.17, 46; 414/446, 458, 495; 254/122

[56] References Cited

U.S. PATENT DOCUMENTS

| | | | |
|---|---|---|---|
| 205,413 | 9/1878 | Wien | 280/35 |
| 2,446,023 | 8/1948 | Pohl | 280/35 |
| 3,618,966 | 11/1971 | Vandervest | 280/43.17 |
| 3,705,731 | 12/1972 | Berchak | 280/43 |
| 3,785,344 | 1/1974 | Patterson | 280/46 |
| 3,806,092 | 4/1974 | Richards | 280/43 |
| 4,105,218 | 8/1978 | Newell | 280/43 |
| 4,213,624 | 7/1980 | Sanders | 280/43.17 |
| 5,249,908 | 10/1993 | Tsai | 414/446 |
| 5,313,817 | 5/1994 | Meinders | 280/43.17 |
| 5,465,985 | 11/1995 | Devan et al. | 280/43.17 |

*Primary Examiner*—D. Glenn Dayoan
*Assistant Examiner*—Clovia Hamilton
*Attorney, Agent, or Firm*—Philip L. Bateman

[57] ABSTRACT

An apparatus is used for manually moving heavy machinery having a rectangular base that rests on a floor. The apparatus contains two components, a rectangular frame and a handle. The frame is formed of four two-sided corner sections that telescope so that the size of the frame is variable. The corner sections contain a platform extending between the bottom surfaces of the two sides. The frame contains two wheels mounted along the exterior surface of one side of the frame and a hitch member mounted along the exterior surface of the opposite side of the frame. The handle has an elongated vertical pole portion, a hand grip at the top end, two wheels at the bottom end, and a projecting hook member extending from the bottom end in a horizontal direction.

12 Claims, 2 Drawing Sheets

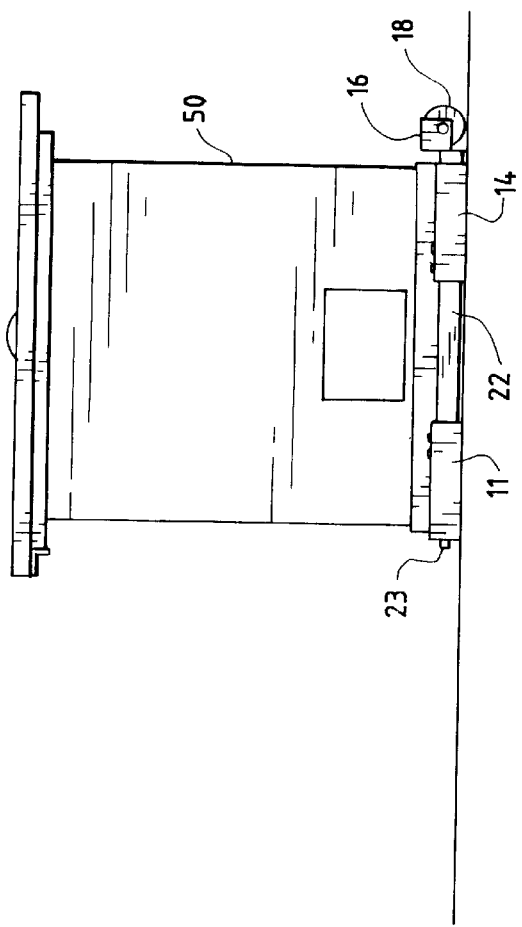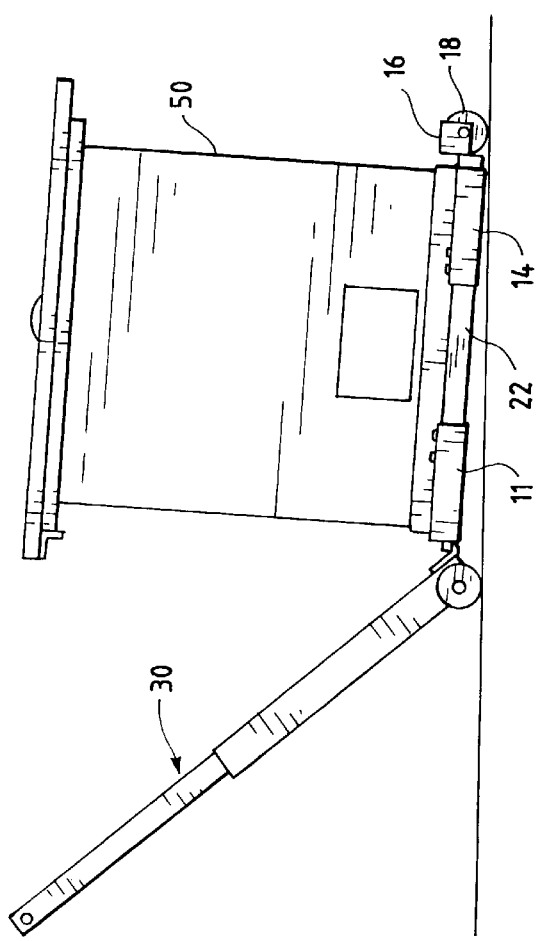

MACHINERY MOVER

CROSS-REFERENCE TO RELATED APPLICATION

This application claims the benefit of U.S. Provisional Application Ser. No. 60/023,082, filed Aug. 2, 1996, now pending.

FIELD OF THE INVENTION

This invention relates to the movement of heavy machinery. More particularly, this invention relates to apparatuses for manually moving heavy machinery.

BACKGROUND OF THE INVENTION

Many types of heavy machinery are used in industrial metal and woodworking shops. Examples of such machinery include saws, drills, lathes, sanders, planers, and shapers. These types of machinery typically rest on the floor, weigh about 200 to 800 pounds, and have rectangular bases with lengths and widths measuring about one to six feet. It is often necessary to move these pieces of machinery, but their size and weight make it difficult, if not impossible, to manually carry them or push them across a floor. Therefore, some type of moving equipment must be used.

Forklifts, hoists, and other types of power equipment are sometimes used to move heavy machinery, but they are expensive and require considerable storage space and maintenance. For these reasons, power moving equipment is not practical for many businesses.

Hand trucks are often used for moving some types of heavy machinery. One end of the machinery is lifted a few inches off the floor, the platform of the hand truck is slid underneath, and the machinery is then lowered onto the platform. To move the machinery, both it and the hand truck are rocked back and balanced on the two wheels of the hand truck. Because of the balancing requirement, the use of hand trucks is limited to relatively lightweight machinery having relatively small bases.

Sarzotto et al., Italian Pat. No. 641,824, issued Jul. 3, 1962, discloses a telescoping frame for moving heavy appliances such as refrigerators and washing machines. The frame contains wheels or casters with brakes at each corner. Triangular horizontal platforms with upwardly projecting ribs are located on the top surface of each corner of the frame. To use the Sarzotto et al. frame, the base of the appliance is first measured. The frame is then adjusted to that size. Next, the brakes are applied so the frame does not move unintentionally during loading. The appliance is then lifted completely off the floor and placed precisely onto the frame. The brakes are then released and the appliance is moved by pushing or pulling on the side of the appliance. The procedure is reversed when the appliance has been moved to the desired position.

HTC Products, Inc. of Royal Oak, Mich. manufactures and sells a line of mobile machine bases consisting of a fixed-size frame supported by three wheels. The interior of the frame contains horizontal platforms along the bottom surface for supporting the machine as it is moved. To place a machine onto the HTC Products base, it must be lifted completely off the floor. Because the frame rests on wheels, one or more of the wheels must be locked or otherwise restrained to prevent unintentional movement. As previously noted, the HTC Products base is not adjustable in size so a separate base must be used for each piece of machinery that is moved.

Delta Company of Pittsburgh, Pa. manufactures and sells a universal mobile base. When assembled with four pieces of hardwood of the desired length, the mobile base consists of a fixed-size frame supported at one end by two wheels and at the other end by two leveling legs. The interior of the frame contains horizontal platforms along the bottom surface for the supporting the machine as it is moved. To place a machine onto the Delta mobile base, it must be lifted completely off the floor.

The Sarzotto et al. frame, the HTC Products mobile machine base, and the Delta mobile base are all useful in moving heavy machinery. However, it would be very desirable if a machinery mover were available that had several features not present in any of these devices. For example, an improved machinery mover would: (1) be adjustable to fit the machinery without measuring; (2) not require the machinery to be completely lifted off the floor during loading and unloading; (3) be stable at rest and during movement; (4) not require the locking and unlocking of wheels; (5) not require the raising and lowering of legs; and (6) be operable by a single man.

SUMMARY OF THE INVENTION

The general object of this invention is to provide an improved machinery mover. A more particular object is to provide a machinery mover that can be easily operated by a single man, is adjustable in size, is durable and inexpensive, is compact for easy storage, can be adjusted to fit a particular piece of machinery without measuring, does not require the machinery to be completely lifted off the floor during loading and unloading, is stable at rest and during movement, and does not require the locking and unlocking of wheels or the raising and lowering of legs.

I have invented an improved apparatus for manually moving heavy machinery having a rectangular base that rests on a floor. The apparatus comprises: (a) a rectangular frame; and (b) a handle. The frame has a bottom surface that defines a horizontal plane. The frame comprises: (i) four two-sided corner sections, each section detachably telescoping with the rest of the frame and having a locking means for securing it to the rest of the frame so that the size of the frame is variable and so that the frame is easily assembled and disassembled, each section having a thin platform in the horizontal plane defined by the bottom surface of the frame, the platform extending between the bottom surfaces of the two sides of the section and being adapted for supporting heavy machinery and for resting flush upon a flat floor; and (ii) two wheels mounted to and along the exterior surface of one side of the frame, each wheel being positioned with its rotational axis parallel to the side of the frame along which it is mounted, each wheel being positioned so that it rests in or a short distance above the horizontal plane defined by the bottom surface of the frame. The handle has an elongated pole portion adapted to be used in a substantially vertical position with a top end and a bottom end. The handle also has a hand grip at the top end and has two wheels at the bottom end, each wheel having the same rotational axis. The handle further has a hook extending from the bottom end in a direction perpendicular to that of the pole portion and perpendicular to the rotational axis of the two wheels of the handle. The hook member is adapted to engage the frame.

The machinery mover of this invention is easily operated by a single man. It is adjustable in size so that it can be used for moving many different pieces of machinery. It is easy to use and it is durable and inexpensive. It is compact for easy storage. It is fast to use because it does not require the machinery to be measured. It does not require the machinery to be lifted off the floor during loading and unloading. It is stable at rest and during movement. And, it does not require the locking and unlocking of wheels or the raising and lowering of legs.

BRIEF DESCRIPTION OF THE DRAWINGS

FIG. 2 is a plan view of the apparatus fully assembled and in place on a piece of machinery.

FIG. 3 is a plan view of the apparatus moving a piece of machinery.

DETAILED DESCRIPTION OF THE INVENTION

Figure 1:
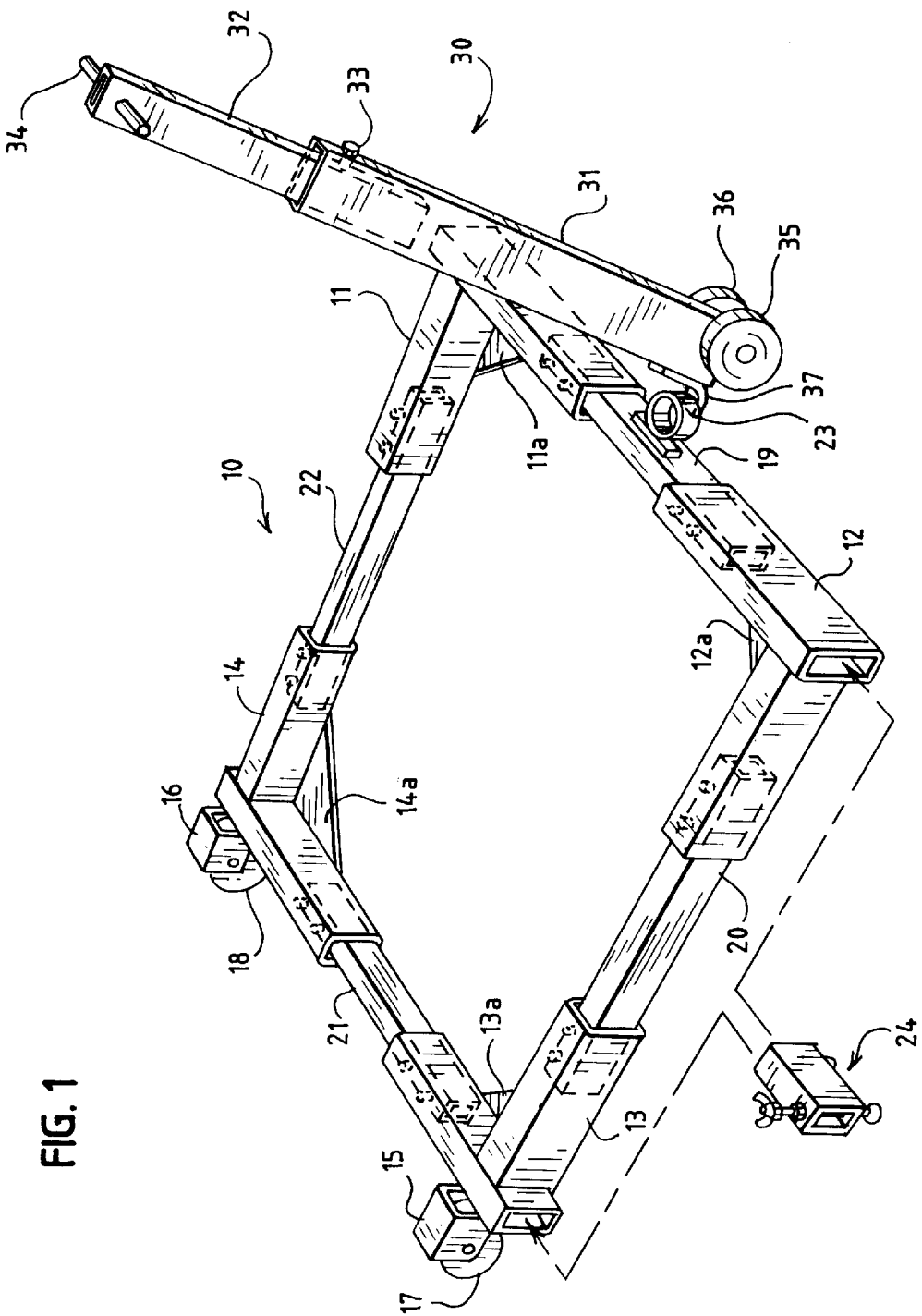
FIG. 1 is a perspective view of the preferred embodiment of the machinery mover apparatus of this invention.

This invention is best understood by reference to the drawings. FIG. 1 show the preferred embodiment of the machinery mover of this invention. The device contains two components—a rectangular frame 10 and a handle 30. Each component is discussed in detail below. It is understood that the term "rectangular" is used in its geometric sense and includes square shapes in which the width and length are equal. The size of the apparatus is a matter of choice depending primarily on the size of the machinery to be moved. The embodiment shown has a width that can be varied from about 14 to 28 inches and a length that can be varied from about 18 to 32 inches. This embodiment can move machinery weighing up to about 800 pounds, including most industrial saws, sanders, shapers, and planers. Larger and heavier frames are useful in moving larger and heavy machinery. Similarly, smaller and lighter frames are useful in moving smaller and lighter machinery.

The frame includes four corner sections 11, 12, 13, and 14. Each corner section contains one side forming part of the width of the frame and one side forming part of the length of the frame. In the embodiment shown, the widthwise side has a length of about seven inches and the lengthwise side has a length of about nine inches. The two sides form a right angle. The lengthwise side abuts the widthwise side so that the outside ends of the widthwise sides are open. Each corner section is made of 14 gauge steel channel having cross-sectional dimensions of about one inch in width by two inches in height. The corner sections have a flat bottom surface defining a horizontal plane so they rest flush on a flat floor. A variety of other sizes, shapes (e.g., round), and materials (e.g., metals other than steel and plastics) are also suitable for the corner sections.

Each corner section contains a platform (11a, 12a, 13a, and 14a) which extends between the bottom surfaces of the two sides. In the embodiment shown, the platform is triangular in shape and is made of 14 gauge steel plate that is welded to the sides. The purpose of the platform is to support a corner of the machinery being moved. Other shapes and configurations are suitable, provided the platform is in the horizontal plane defined by the bottom surface of the frame, i.e., is substantially flush with the floor surface. Along the top of each side of each section, near the open end, two set screws are threaded through openings in the channel. As will be seen, the set screws are used to lock the frame in the desired size. A variety of mechanisms for locking telescoping parts are known in the art and the selection of the mechanism for this apparatus is a non-critical matter of choice.

Corner sections 13 and 14 contain wheel housings 15 and 16 that, in turn, hold wheels 17 and 18. The wheels are positioned so they rest flush on the floor (i.e., in the same horizontal plane as the bottom surface of the frame) or a short distance (i.e., less than about one-half inch) above the floor when the corner sections are also resting flush on the floor. If the wheels rest below the horizontal plane of the frame, it can be seen that one side of the frame will be elevated above the floor at rest. Having one side of the frame elevated is undesirable for several reasons. First, the machine is tilted at rest unless legs or the like are used to elevate the other end of the frame. Second, the frame is not as stable at rest because it rests on only four points of contact.

The frame rests on the wheels alone only when tilted so the wheels and the wheel housings are strong enough to support the weight of the machine to be moved. The wheels have a diameter of about three inches. Wheels having a diameter greater than about three inches are preferable for moving machinery heavier than about 800 pounds. Casters, air wheels, air pads, and other rolling devices are also suitable.

The frame also includes four bars (19, 20, 21, and 22) that fit inside, extend between, and connect the corner sections in a telescoping manner. The widthwise bars 19 and 21 are about 18 inches in length and, due to the open ends of the widthwise sides of the corner sections, can extend a short distance outside the corner sections if desired. The lengthwise bars 20 and 22 are about 20 inches in length so they can fit inside the lengthwise sides of the corner sections. The frame can be varied in size, or completely disassembled, by simply loosening the appropriate set screws and then sliding the corner sections to the desired positions. The frame is locked in the desired size by tightening the set screws. An alternative construction is to employ corner sections that telescope directly into each other and thereby eliminate the bars altogether. Another alternative construction is to employ a fixed-size frame. A fixed-size frame does not, of course, have the adaptability of an adjustable-size frame. However, it may be desirable if only a single piece of machinery is ever to be moved.

Bar 19, located on the side of the frame opposite the wheels, contains a hitch consisting of a cylindrical ring 23 mounted with its axis in a vertical orientation. The ring has a diameter of about one inch and a height of about one-half inch. As discussed below, the ring is engaged by the hook member of the handle when the machinery mover apparatus is moved. The curve of the ring enables the hook to maintain full contact as it rotates when the direction of movement is changed. Other configurations of the hitch are suitable, including U-shaped structures, with the preferred configuration being dependent upon the configuration of the hook of the handle. The hitch can be omitted entirely, however, the movement of the frame by the handle is more difficult because the handle cannot be moved at an angle to the frame.

As previously discussed, the frame rests flush on a flat floor so that unintentional movement is eliminated. However, some industrial locations have floors that are not flat and the frame may tend to rock slightly. If it is desired to eliminate even this minor rocking, either the frame can be shimmed or a leveler 24 can be inserted into one or more of the open ends of the frame. One end of the leveler fits tightly into the frame and the other end contains a threaded foot that can be lowered to eliminate any rocking.

When moving long machines having a solid base and an overhanging work surface supported by legs (e.g., a cabinet saw), it is sometimes desirable to add a reinforcing member that fits over the lengthwise bars and extends widthwise across the frame. The reinforcing member is preferably locked into place with set screws or the like and contains platforms that are flush with the floor surface in the same manner as the corner section platforms.

The second component of the machinery mover apparatus is the handle 30. It contains an elongated pole portion made of two telescoping pieces 31 and 32 that are held in position with bolt 33 threaded though an opening in the lower telescoping portion. The handle is used in a substantially vertical position and has a length (height) that can vary between about 20 to 40 inches. Greater lengths provide more leverage and are desirable for moving machinery weighing more than about 800 pounds. The telescoping feature of the handle enables it to be adjusted for the optimal height, enables the handle to be stored compactly, and enables the handle to be engage the hitch even if the machine overhangs the hitch. If none of these purposes is important, the telescoping feature can be eliminated. The top piece of the handle contains hand grips 34 to ease manipulation of the handle.

The lower piece of the handle contains a pair of wheels 35 and 36 that are mounted so they extend a short distance below the pole portion. As will be seen, the pole portion does not contact the floor when it is tilted back (away from the frame when positioned as shown in FIG. 1). A single cylinder can be substituted for the pair of wheels or, alternatively, three or more wheels can be used. A projecting hook member 37 is mounted at the bottom of the pole portion, in between the wheels, and extends horizontally a distance of about one inch. The hook is located slightly above the bottom of the wheels so that the handle can stand upright with a slight forward tilt. The hook member is adapted to engage the hitch of the frame or, if there is no hitch, the frame itself.

In the embodiment of the machinery mover shown, the handle must be balanced between vertical and horizontal when the apparatus is moved. If it is desired to maintain the machinery mover on the wheels of the handle without balancing, one of several small changes in structure can easily provide this capability. For example, positioning the hitch a greater distance away from the frame and adding a pivot point near the bottom of the handle enables the handle wheels to rest under the hitch in a stable position. As another example, the handle wheels can be incorporated as part of the frame and the pole portion reduced in size or eliminated. If the pole portion is eliminated, the machinery mover is moved by pushing against the machinery resting in the apparatus.

FIGS. 2 and 3 illustrate the use of the apparatus to move a floor-mounted table saw 50. The first step in using the apparatus is to loosen the set screws on the frame and disassemble the corner sections. The corner sections are then placed on the floor near each corner of the table saw. Each of the four bars is inserted loosely into one of the corner sections. The table saw is then rocked backward to raise one side a short distance (e.g., about one-half inch to about two or more inches) off the floor. While the table saw is raised, the two corner sections corresponding to the raised corners are moved under the table saw with the feet. The table saw is then lowered and the process is repeated at the opposite end.

After all four corner sections have been slid into position, the set screws are tightened and, as shown in FIG. 2, the table saw is ready for movement. It can also be noted that the table saw is in a very stable position at this point. The bottom of the frame is in contact with the floor so there is no danger of the frame rolling away and there is no need to lock the wheels. The table saw is resting only a fraction of an inch (the thickness of the corner section platforms) off the floor so the table saw's center of gravity is virtually unchanged and there is no danger of tipping.

To move the table saw, the handle is rolled into position next to the cylindrical ring. The hook member is inserted under the hitch and the handle is rocked back. The hook member engages the hitch and the frame is raised off the floor. The small raising of the frame is enough to make the two wheels of the frame become the only point of contact with the floor, as shown in FIG. 3. The apparatus is now moving on four wheels and it can be easily pulled or pushed to the desired location. The pulling or pushing force is applied to the frame itself, rather than to the table saw, so there is no danger of tipping during movement.

When the table saw has been moved into the desired location, the process can be reversed. The handle is disengaged, the frame set screws are loosened, the corner sections are pulled away from under the table saw, and, finally, the frame is reassembled for storage. However, in most cases, the frame is left in position indefinitely because the stability of the machine is unaffected.

I claim:

1. An apparatus for manually moving heavy machinery having a rectangular base that rests on a floor, the apparatus comprising:

(a) a rectangular frame adapted to be used in a substantially horizontal position, the frame comprising:

(i) four two-sided corner sections; each section having an exterior surface , a top surface defining an upper horizontal plane, and a bottom surface defining a lower horizontal plane; each section detachably telescoping with the rest of the frame and having a locking means for securing it to the rest of the frame so that the size of the frame is variable and so that the frame is easily assembled and disassembled; each section having a platform in the lower horizontal plane and below the upper horizontal plane; the platform extending between the bottom surfaces of the two sides of the section and being adapted for supporting heavy machinery and for resting flush upon a flat floor; and (ii) two frame wheels mounted to and along the exterior surface of one side of the frame, each frame wheel having a rotational axis, each frame wheel being positioned with its rotational axis parallel to the side of the frame along which it is mounted, each frame wheel being positioned so that it contacts the floor in the lower horizontal plane; and (b) a handle having an elongated pole portion adapted to be used in a substantially vertical position with a top end and a bottom end, the handle having a hand grip at the top end and having two handle wheels at the bottom end, each handle wheel having a rotational axis, each handle wheel having the same rotational axis, the handle also having a hook member extending from the bottom end in a direction perpendicular to that of the pole portion and perpendicular to the rotational axis of the two handle wheels, which hook member is adapted to engage the frame.

2. The apparatus of claim 1 wherein the rectangular frame additionally comprises: (iii) a hitch mounted to and along an exterior surface of the side of the frame opposite the frame wheels and wherein the hook member of the handle is adapted to engage the hitch.

3. The apparatus of claim 2 wherein the rectangular frame additionally comprises: (iv) four bars that fit inside, extend between, and connect the corner sections in a telescoping manner.

4. The apparatus of claim 3 wherein the locking means of the corner sections comprises set screws that engage the bars.

5. The apparatus of claim 4 wherein the hitch comprises a cylindrical ring having an axis, which axis is mounted with its axis in a vertical orientation.

6. An apparatus for manually moving heavy machinery having a rectangular base that rests on a floor, the apparatus comprising:

(a) a rectangular frame adapted to be used in a substantially horizontal position, the frame comprising:

(i) four two-sided corner sections; each section having an exterior surface , a top surface defining an upper horizontal plane, and a bottom surface defining a lower horizontal plane; each section detachably telescoping with the rest of the frame and having a locking means for securing it to the rest of the frame so that the size of the frame is variable and so that the frame is easily assembled and disassembled; each section having a platform in the lower horizontal plane and below the upper horizontal plane; the platform extending between the bottom surfaces of the two sides of the section and being adapted for supporting heavy machinery and for resting flush upon a flat floor; and (ii) two frame wheels mounted to and along the exterior surface of one side of the frame, each frame wheel having a rotational axis, each frame wheel being positioned with its rotational axis parallel to the side of the frame along which it is mounted, each frame wheel being positioned so that it contacts the floor in the lower horizontal plane.

7. The apparatus of claim 6 additionally comprising a handle having an elongated pole portion adapted to be used in a substantially vertical position with a top end and a bottom end, the handle having a hand grip at the top end and having two handle wheels at the bottom end, each handle wheel having a rotational axis, each handle wheel having the same rotational axis, the handle also having a hook member extending from the bottom end in a direction perpendicular to that of the pole portion and perpendicular to the rotational axis of the two handle wheels, which hook member is adapted to engage the frame.

8. The apparatus of claim 7 wherein the rectangular frame additionally comprises: (iii) a hitch mounted to and along an exterior surface of the side of the frame opposite the frame wheels and wherein the hook member of the handle is adapted to engage the hitch.

9. The apparatus of claim 8 wherein the rectangular frame additionally comprises: (iv) four bars that fit inside, extend between, and connect the corner sections in a telescoping manner.

10. The apparatus of claim 9 wherein the locking means of the corner sections comprises set screws that engage the bars.

11. The apparatus of claim 5 wherein the platform of each two-sided corner section has a thickness about that of 14 gauge steel plate.

12. The apparatus of claim 10 wherein the platform of each two-sided corner section has a thickness about that of 14 gauge steel plate.

* * * * *